(12) United States Patent
Shyu et al.

(10) Patent No.: US 7,936,527 B2
(45) Date of Patent: May 3, 2011

(54) AUTO FOCUS LENS MODULE WITH PIEZOELECTRIC ACTUATOR

(75) Inventors: San-Woei Shyu, Taipei (TW); Chin-Yi Chou, Taipei (TW); Teng-Chien Yu, Taipei (TW)

(73) Assignee: E-Pin International Tech Co., Ltd., Taipei (TW)

( * ) Notice: Subject to any disclaimer, the term of this patent is extended or adjusted under 35 U.S.C. 154(b) by 0 days.

(21) Appl. No.: 12/845,123

(22) Filed: Jul. 28, 2010

(65) Prior Publication Data

US 2011/0026151 A1 Feb. 3, 2011

(30) Foreign Application Priority Data

Jul. 28, 2009 (TW) ................................ 98213835 U

(51) Int. Cl.
*G02B 7/02* (2006.01)
*G02B 15/14* (2006.01)
(52) U.S. Cl. ................ 359/824; 359/823; 359/694
(58) Field of Classification Search .......... 359/694–704, 359/811–824; 396/79, 133, 137, 55; 348/208.11, 348/345, 335; 310/323.17, 317, 332, 323.02
See application file for complete search history.

(56) References Cited

U.S. PATENT DOCUMENTS

| | | | | |
|---|---|---|---|---|
| 6,594,450 B1 | 7/2003 | Kao | | 396/133 |
| 7,145,738 B2 | 12/2006 | Shu | | 359/824 |
| 7,262,926 B2 * | 8/2007 | Ohsato | | 359/814 |
| 7,298,564 B2 * | 11/2007 | Rouvinen et al. | | 359/824 |
| 7,480,109 B1 | 1/2009 | Hu | | 359/824 |
| 2007/0153404 A1 | 7/2007 | Rouvinen | | 359/821 |
| 2008/0013196 A1 | 1/2008 | Shyu | | 359/824 |
| 2008/0085110 A1 | 4/2008 | Su | | 396/133 |
| 2008/0144201 A1 | 6/2008 | Koc | | 359/824 |
| 2008/0174889 A1 | 7/2008 | Su | | 359/824 |
| 2008/0231970 A1 | 9/2008 | Henderson | | 359/696 |
| 2008/0246353 A1 | 10/2008 | Kuo | | 310/14 |
| 2008/0297923 A1 | 12/2008 | Koc | | 359/824 |
| 2009/0153987 A1 | 6/2009 | Kim | | 359/823 |
| 2011/0026150 A1* | 2/2011 | Shyu et al. | | 359/824 |

FOREIGN PATENT DOCUMENTS

| | | |
|---|---|---|
| JP | 4-330644 | 11/1992 |
| JP | 2004020935 | 1/2004 |
| JP | 3124292 | 7/2006 |
| JP | 3132575 | 5/2007 |
| TW | I265357 | 6/2005 |
| TW | M317027 | 3/2007 |

* cited by examiner

*Primary Examiner* — Mohammed Hasan
(74) *Attorney, Agent, or Firm* — Muncy, Geissler, Olds & Lowe, PLLC

(57) ABSTRACT

An auto focus lens module with a piezoelectric actuator having a piezoelectric actuator, a tangent thrust element, a sliding fixture, a metal member, a guiding fixture, and a lens barrel is revealed. By a thrust in the tangent direction generated from the tangent thrust element toward the outer edge of the lens barrel, a friction is generated between the lens barrel and the piezoelectric actuator. When the piezoelectric actuator is applied with a voltage, the lens barrel driven by the piezoelectric actuator moves along an optical axis for focusing with the auxiliary of the guiding fixture. Due to fewer elements, light weight and compact volume, the design is applied to miniature auto focus lens modules so as to achieve effects of fast movement, stable focusing and reduced tilting.

3 Claims, 6 Drawing Sheets

AUTO FOCUS LENS MODULE WITH PIEZOELECTRIC ACTUATOR

BACKGROUND OF THE INVENTION

The present invention relates to an auto focus lens module with a piezoelectric actuator, especially to an auto focus lens module with a piezoelectric actuator for driving an optical lens set.

Digital cameras or mobile phone cameras include a lens module that drives optical lens set moving along an optical axis so as to achieve autofocusing and/or zoom in/zoom out. One of the movement ways of the optical lens set is by Voice coil motor (VCM). After a current being applied to a coil, a driving force is generated in an electromagnetic field created by a permanent magnet so as to drive the optical lens set moving along the optical axis. Such design can reduce volume of lens modules so that it has been applied to mini-sized cameras, camera-equipped cellular phone or web-cameras broadly, as shown in US2008/0013196, U.S. Pat. Nos. 6,594, 450, 7,145,738, TW M317027, JP3124292, JP3132575 and so on.

Ultrasonic motor (USM) is a type of electric motor formed from the ultrasonic vibration of piezoelectric material that is deformed while being applied with voltage. Then by design of a friction drive, the ultrasonic motor moves in a rotational or straight way, as prior arts disclosed in US2009/0153987, US2008/0297923, US2008/0174889 etc. Refer to FIG. 1, as revealed in US2008/0246353 etc., the ultrasonic motor is applied to auto focus lens module. A piezoelectric actuator 902 is disposed on the fixed element 9091 and is connected with a lens moving element 9092 by a connector 9021 for generating a piezoelectric driving force. Moreover, a coil element 907, together with a magnet element 908, is o generate an electric-magnetic force. By a balance between the piezoelectric driving force and the electric-magnetic force, the lens moving element 9092 and the lens set 901 are driven to move along shafts 904 for focusing.

Refer to FIG. 2, as revealed in U.S. Pat. No. 7,480,109, US2008/0085110, etc., a piezoelectrically driven optical lens module includes a guiding rod 904 having a frictional surface 9021, and a piezoelectric actuator 902, mounted in an elastic element 903 so as to drive the lens set 9012 as well as the lens barrel 9011 to move along a guide pin 9043 by a guide slot 9042 for focusing.

Refer to FIG. 3, another USM-type auto focus lens module revealed in US2008/0231970 includes a plate spring 903. By an elastic force from the plate spring 903, against two piezoelectric actuator 902, a friction force is generated between a guide rail 904 and a lens barrel 901. However, the plate spring 903 has complicated structure, high volume requirement and large space, it is not suitable for mini-sized lens modules.

In order to make the lens module move stably without tilting, devices disclosed in US2008/0144201, JP2004020935, etc. includes a guide rod arranged between the lens barrel and a housing of the lens module so as to stabilize the lens barrel. In US2007/0153404, a rail is used. Refer to TW 1265357, two sets of piezoelectric actuators are arranged on edges of the lens barrel so as to make the movement thereof become stable. However, conventional ultrasonic motors for movement of the lens barrel have shortcomings of complicated structure, high cost or large volume in designs of the guiding rod or friction generation so that they are difficult to be applied to compact auto focus lens modules. Thus there is a need to develop a driving member with high reliable and high stable structure that replaces conventional ways of generating friction. Moreover, requirements of simple structure, high precision, fast focus and reduced tilting need to be satisfied.

SUMMARY OF THE INVENTION

Therefore it is a primary object of the present invention to provide an auto focus lens module with a piezoelectric actuator having a piezoelectric actuator, a lens module and a frame. The piezoelectric actuator and the lens module are mounted in the frame. The lens module consists of a lens barrel fixed with an optical lens set therein, a tangent thrust element, a guiding fixture, a sliding fixture and a metal member. The metal member is fixed on surface of the lens barrel and is contacted with the piezoelectric actuator. The guiding fixture is formed by a guiding slot and a guide pin, corresponding to each other. The guiding slot is disposed on the lens barrel. The lens module slides along an optical axis under the guidance of the guide pin and being fixed in the frame. The sliding fixture includes a slide slot and a slide rod, corresponding to each other. The lens barrel move along an optical axis by the slide rod. The tangent thrust element is arranged outside the lens barrel and having a plurality of balls arranged and corresponding springs. By elastic force of the spring, the ball generates a thrust in the tangent direction along the outer edge of the lens barrel so that a friction is generated on an interface between the metal member and the piezoelectric actuator. When the piezoelectric actuator is applied with a voltage, the lens module is driven by the piezoelectric actuator to move along the optical axis in the frame for focusing.

It is another object of the present invention to provide an auto focus lens module with a piezoelectric actuator with broader applications in which the tangent thrust element further includes two permanent magnets and a push board. The push board is disposed on one side of the permanent magnet, contacting with the slide rod of the sliding fixture. A pushing force toward the push board is generated by repulsion of like poles of the two permanent magnets and a thrust in the tangent direction along the outer edge of the lens barrel is further generated so as to form a friction on an interface between the metal member and the piezoelectric actuator. When the piezoelectric actuator is applied with a voltage, the lens barrel is driven by the piezoelectric actuator to move along the optical axis in the frame for focusing.

DETAILED DESCRIPTION OF THE PREFERRED EMBODIMENT

Embodiment 1

Figure 1:
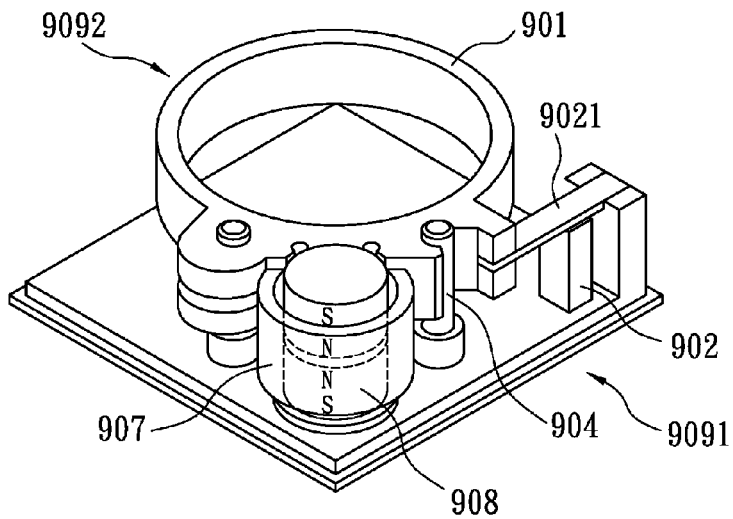
FIG. 1 is a conventional auto focus lens module with a voice coil motor and a piezoelectric actuator.
Figure 2:
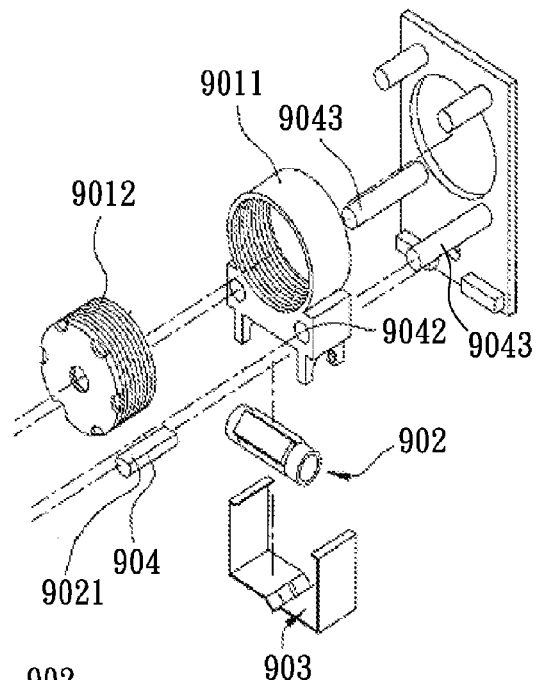
FIG. 2 is a conventional auto focus lens module with another piezoelectric actuator.
Figure 3:
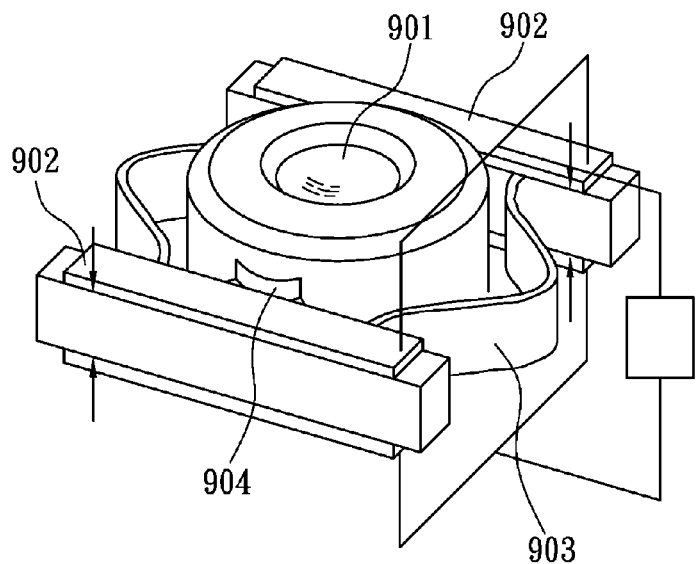
FIG. 3 is a further conventional auto focus lens module with two piezoelectric actuators.
Figure 4:
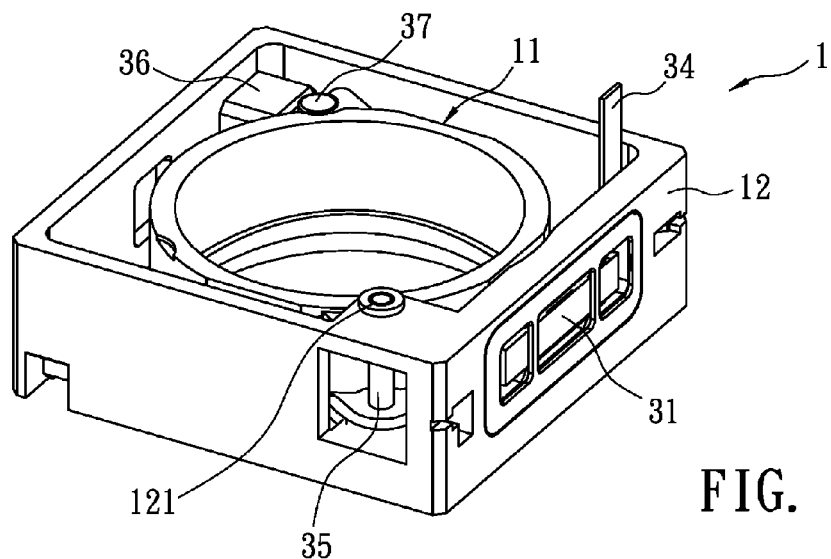
FIG. 4 is a schematic view of an embodiment according to the present invention.
Figure 5:
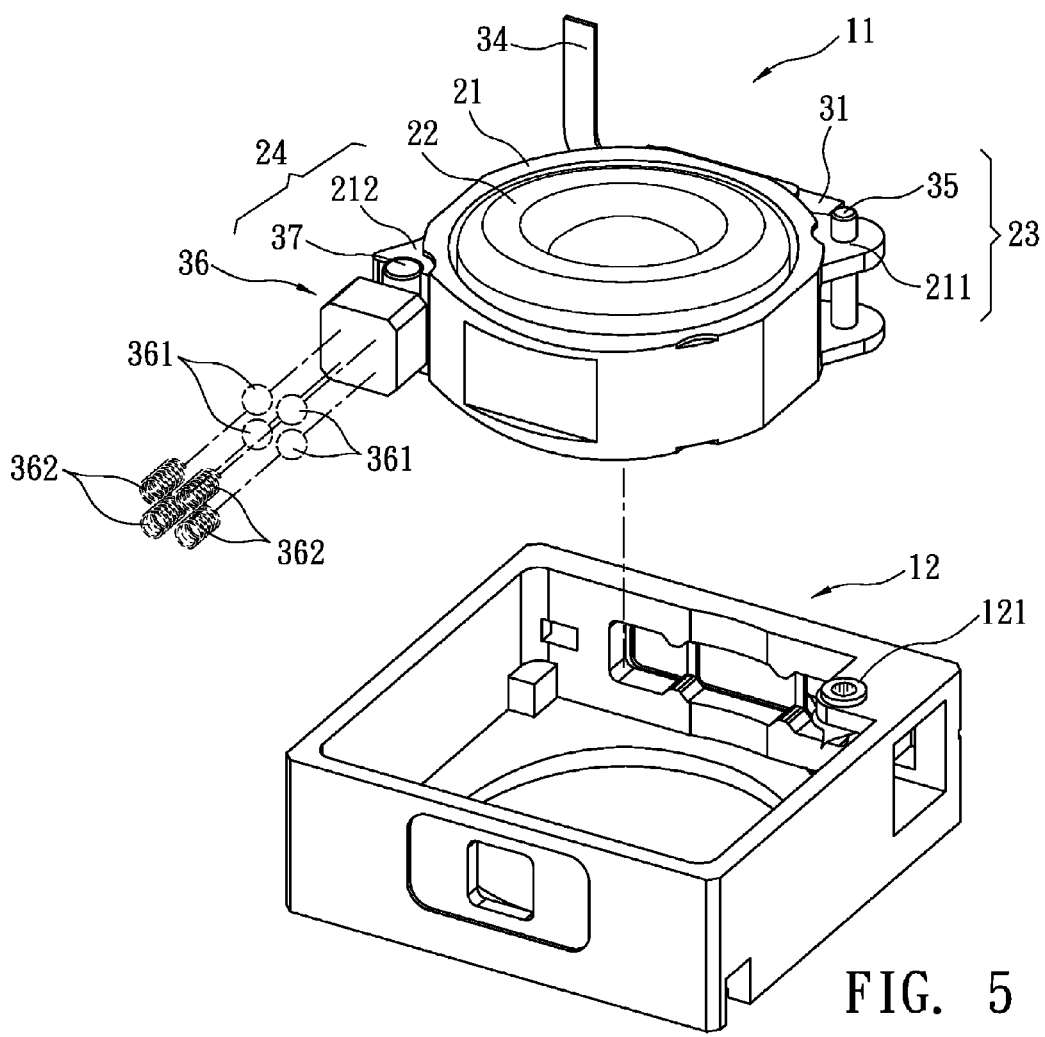
FIG. 5 is an explosive view of an embodiment according to the present invention.
Figure 6:
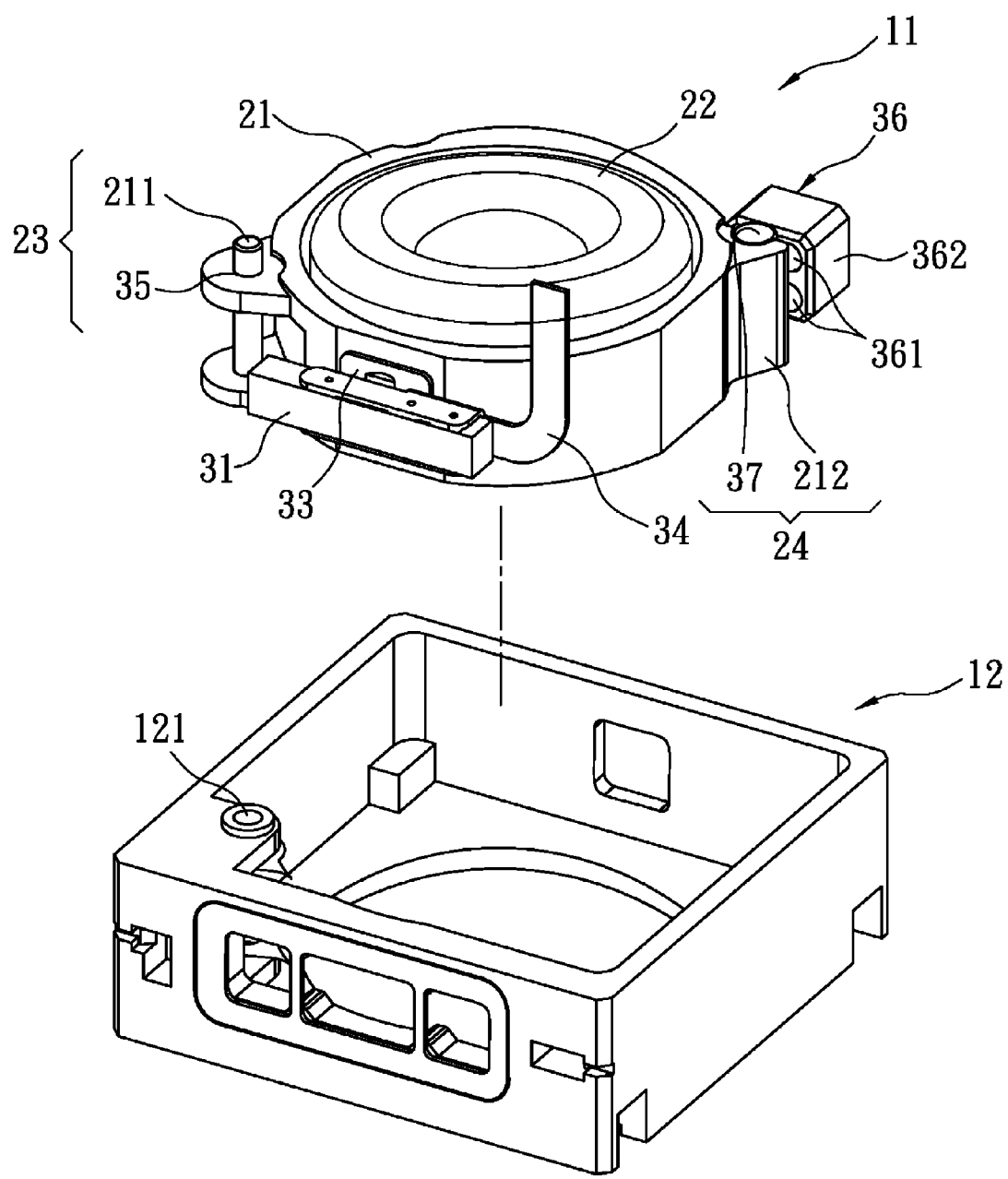
FIG. 6 is another explosive view of an embodiment according to the present invention.
Figure 7:
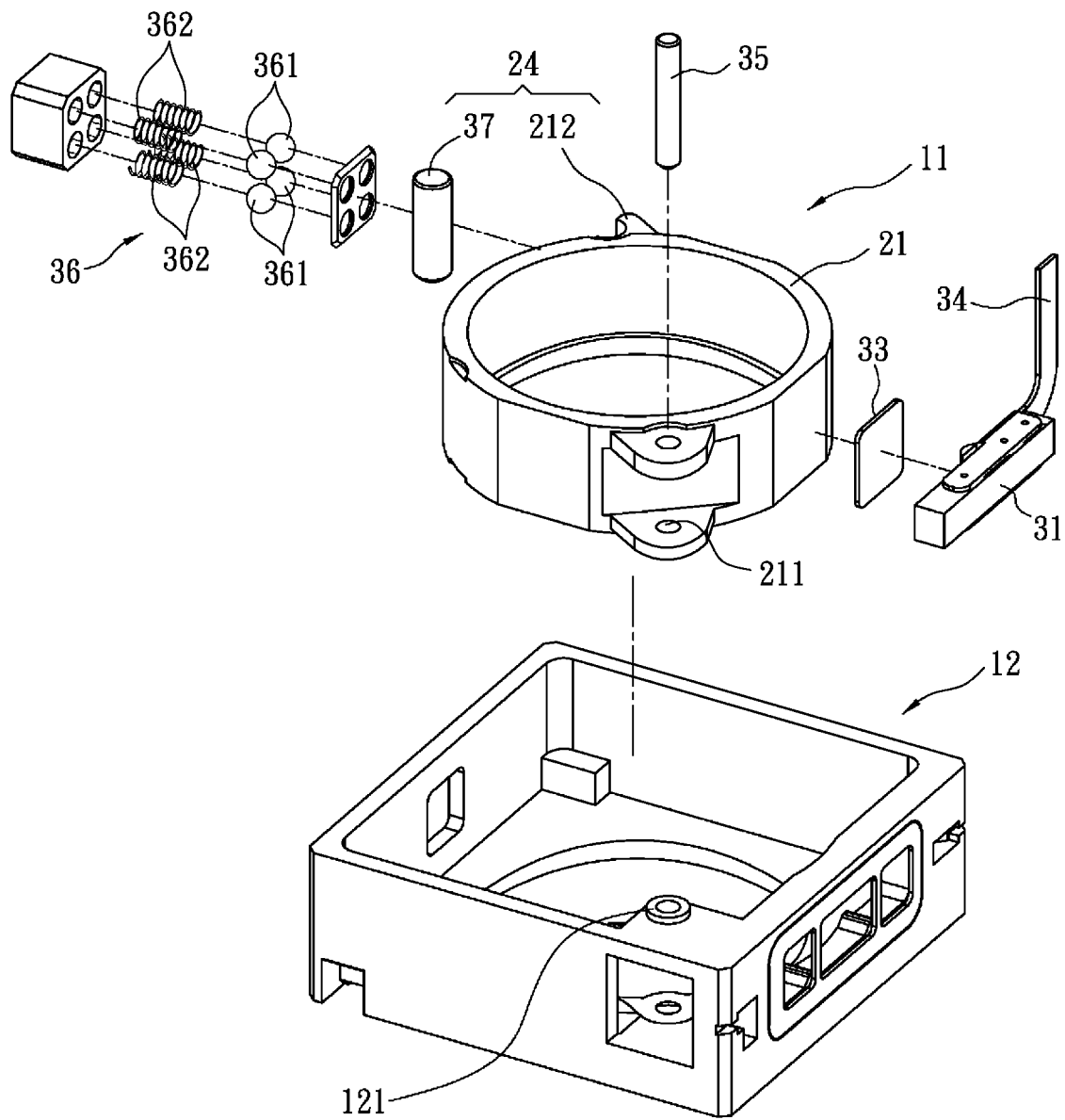
FIG. 7 is a further explosive view of an embodiment according to the present invention.

Refer from FIG. 4 to FIG. 7, an auto focus lens module with a piezoelectric actuator 1 according to the present invention includes a piezoelectric actuator 31, a lens module 11 and a frame 12. The piezoelectric actuator 31, and the lens module 11 are mounted in the frame 12. The piezoelectric actuator 31 whose electrode 34 is connected with a voltage controller (not shown in figure) is fixed in the frame 12. Generally, due to converse piezoelectric effect of piezoelectric materials, the application of an electrical field creates mechanical deformation in the materials and further leads to displacement. According to motions of piezoelectric materials, the piezoelectric actuator is classified into: (1) linear vertical motion: having single-layer type and multi-layer type, with advantages of high rigidity and large axial thrust force. (2) curved horizontal motion: including Unimorph type and Bimorph type. The piezoelectric actuator that moves in this way has larger displacement. In this embodiment, bimorph piezoelectric material with curved horizontal motion is used. When the voltage controller outputs a voltage, a resonant frequency and a phase angle and conducts to the piezoelectric actuator 31 by the electrode 34 so as to generate waveform vibrations and drive the lens module 11 to move forward or backward through friction.

The lens module 11 is composed of a lens barrel 21, an optical lens set 22, a tangent thrust element 36, a metal member 33, a guiding fixture 23, and a sliding fixture 24. The optical lens set 22 is fixed in the lens barrel 21 and is formed by at least one optical lens for concentrating light on an image sensor (not shown in figure).

The metal member is fixed on surface of the lens barrel and is contacted with the piezoelectric actuator. The guiding fixture is formed by a guiding slot and a guide pin, corresponding to each other. For the auto focus lens module 11, the lens barrel 21 moves along an optical axis and the optical lens set 22 also move along with the movement of the lens barrel 21 so that the distance between the optical lens set 22 and the image sensor varies to have different imaging effects. However, the lens barrel 21 needs stability, without tilt for optimal imaging effects. This embodiment includes a guiding fixture 23 and a sliding fixture 24. The guiding fixture 23 includes at least one guiding slots 211 and corresponding guide pins 35, both parallel to the optical axis. The guiding slot 211 is arranged at the lens barrel 21. By the guide pin 35 that connects the guiding slot 211 of the lens barrel 21 with a fixing ring 121 of the frame 12, the lens barrel 22 is set movably in the fixing ring 121 of the frame 12. The sliding fixture 24 is formed by a slide slot 212 and a corresponding slide rod 37, both parallel to the optical axis. The slide slot 212 is set on the lens barrel 21 so as to slide upward and downward along the slide rod 37. By the guiding fixture 23 and the sliding fixture 24, the lens module 11 moves upward and downward stably along the guide pin 35 and the slide rod 37 in the frame 12.

The tangent thrust element 36 is disposed outside the lens barrel 21 whose one end surface leans against the slide rod 37 while the other end surface is fixed on an inner surface of the frame 12 so as to make the auto focus lens module 1 become more compact and overcome the shortcoming of conventional technique—the large volume caused by plate springs disposed around the lens barrel. The tangent thrust element 36 consists of four symmetrically arranged balls 361 and four corresponding springs 362. By the elastic spring force of each spring 362 such as compression spring, the ball 361 is pushed to move forward and rest against the slide rod 37. Thus the elastic force is transmitted to the slide rod 37 and the lens barrel 21 so as to generate a thrust in the tangent direction along the outer edge of the lens barrel 21 (the tangent thrust). Therefore the lens barrel 21 presses the piezoelectric actuator 31 by the tangent thrust. Moreover, the use of the ball 361 is for reducing its friction and abrasion with the slide rod 37 of the sliding fixture 24.

The metal member 33 is fixed on a facet of the lens barrel 21 and is contacting with the piezoelectric actuator 31. By the trust from the tangent thrust element 36, a friction is formed between the metal member 33 and the piezoelectric actuator 31. When the voltage controller outputs the voltage, the resonant frequency and the phase angle, all conducting to the piezoelectric actuator 31 by the electrode 34 so as to generate waveform vibrations and transmit the vibrations to the lens module 11 through the friction and the lens module 11 moves forward/backward in a straight line.

Compared with conventional lens modules, the above design makes the lens module 11 moves stably and rapidly while the tilting of the lens module 11 is reduced. Moreover, the auto focus lens module 1 is minimized so as to be used in miniature optical systems.

Embodiment 2

Figure 8:
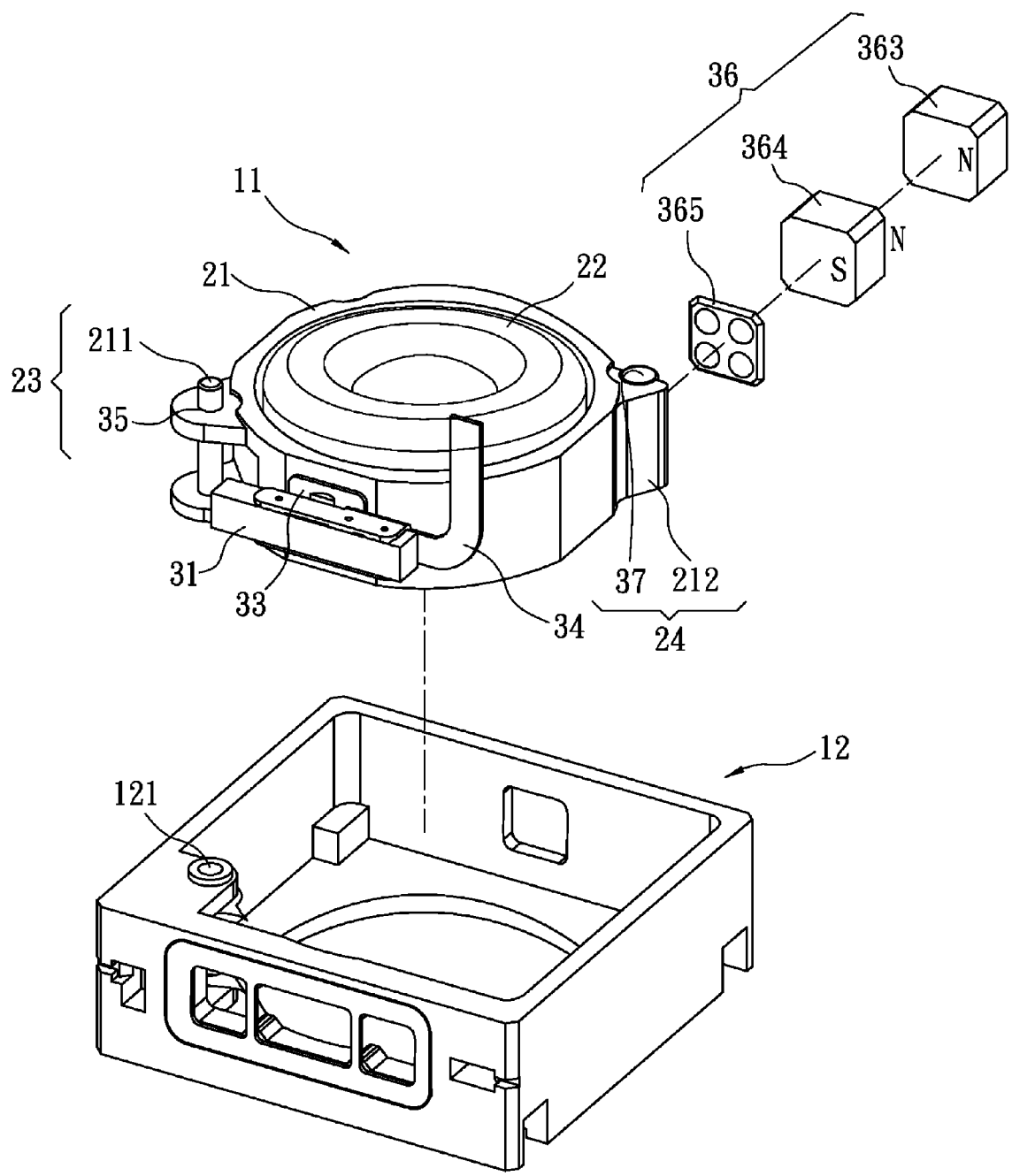
FIG. 8 is an explosive view of another embodiment according to the present invention.
Figure 9:
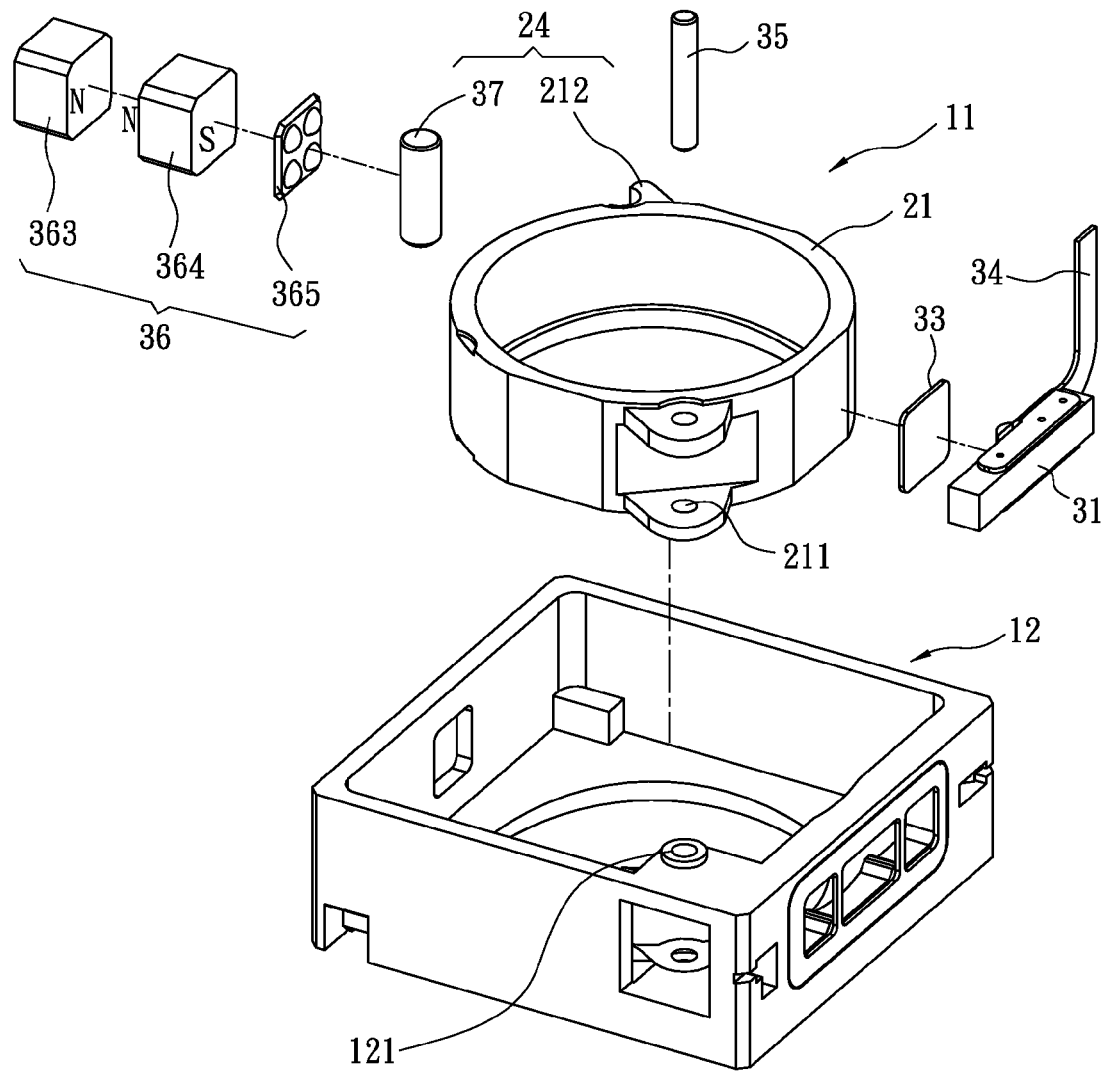
FIG. 9 is another plosive view of another embodiment according to the present invention.

Refer to FIG. 8 and FIG. 9, this embodiment has similar structure to that of the above embodiment. Yet the tangent thrust element 36 in this embodiment includes two permanent magnets 363, 364 and a push board 365. The push board 365 made from metal is disposed on one side of the permanent magnet 364 and is contacting with the slide rod 37 of the sliding fixture 24. Four knobs are arranged at the surface of the push board 365 so as to reduce friction and abrasion between the push board 365 and the slide rod 37. There is no limit on the material and shape of the push board 365. Both the slide rod 36 and the lens barrel 21 are made from non-magnetic conducting material. The like poles of two permanent magnets 363, 364 are brought together, in this embodiment, the like pole is a north pole), the magnets repel each other so that a thrust in the tangent direction along the outer edge of the lens barrel is generated (the tangent thrust). Thus the lens barrel 21 presses the piezoelectric actuator 31 by this tangent thrust. In other words, the repulsion of like poles of the two permanent magnets 363, 364 is used as a thrust force for propelling the slide rod 37 so as to replace the elastic spring force from the spring 362 used as a thrust force for propelling the slide rod 37 through the ball 361 in the above embodiment.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An auto focus lens module with a piezoelectric actuator, comprising:
   a frame;
   a piezoelectric actuator being disposed in the frame and being used to generate vibrations; and
   a lens module being disposed in the frame, comprising:
   a lens barrel;
   an optical lens set disposed in the lens barrel;

a tangent thrust element disposed outside the lens barrel and being used to generate a thrust in the tangent direction of the lens barrel;

a metal member pressed the piezoelectric actuator by the thrust;

a guiding fixture comprising a guiding slot and a guide pin, corresponding to each other and parallel to an optical axis, the guiding slot being arranged at the lens barrel, the lens barrel and the frame being slidably fixed by the guide pin so that the lens barrel moves upward and downward along the optical axis by the guide pin in the frame; and a sliding fixture comprising a slide slot and a slide rod, corresponding to each other and parallel to the optical axis, the slide slot being disposed on the lens barrel and the slide rod disposed at the slide slot so that the lens barrel move along the optical axis by the slide rod;

wherein when the piezoelectric actuator is applied with a voltage, a friction force is generated on an interface between the metal member and the piezoelectric actuator, the lens barrel is driven by the friction force to move along the optical axis in the frame with the auxiliary of the guiding fixture as well as the sliding fixture for focusing.

2. The device as claimed in claim 1, wherein the tangent thrust element comprises a plurality of balls and corresponding springs, each ball is pushed by each of the spring so that each of the ball is touched the slide rod of the sliding fixture, and a thrust in the tangent direction along the outer edge of the lens barrel is generated.

3. The device as claimed in claim 1, wherein the tangent thrust element comprises two permanent magnets and a push board, the push board is disposed on one side of one of the permanent magnets, leaning against the slide rod of the sliding fixture, the push board is against the slide rod elastically by repulsion of like poles of the two permanent magnets so as to generate a thrust in the tangent direction along the outer edge of the lens barrel.

* * * * *